UNITED STATES PATENT OFFICE.

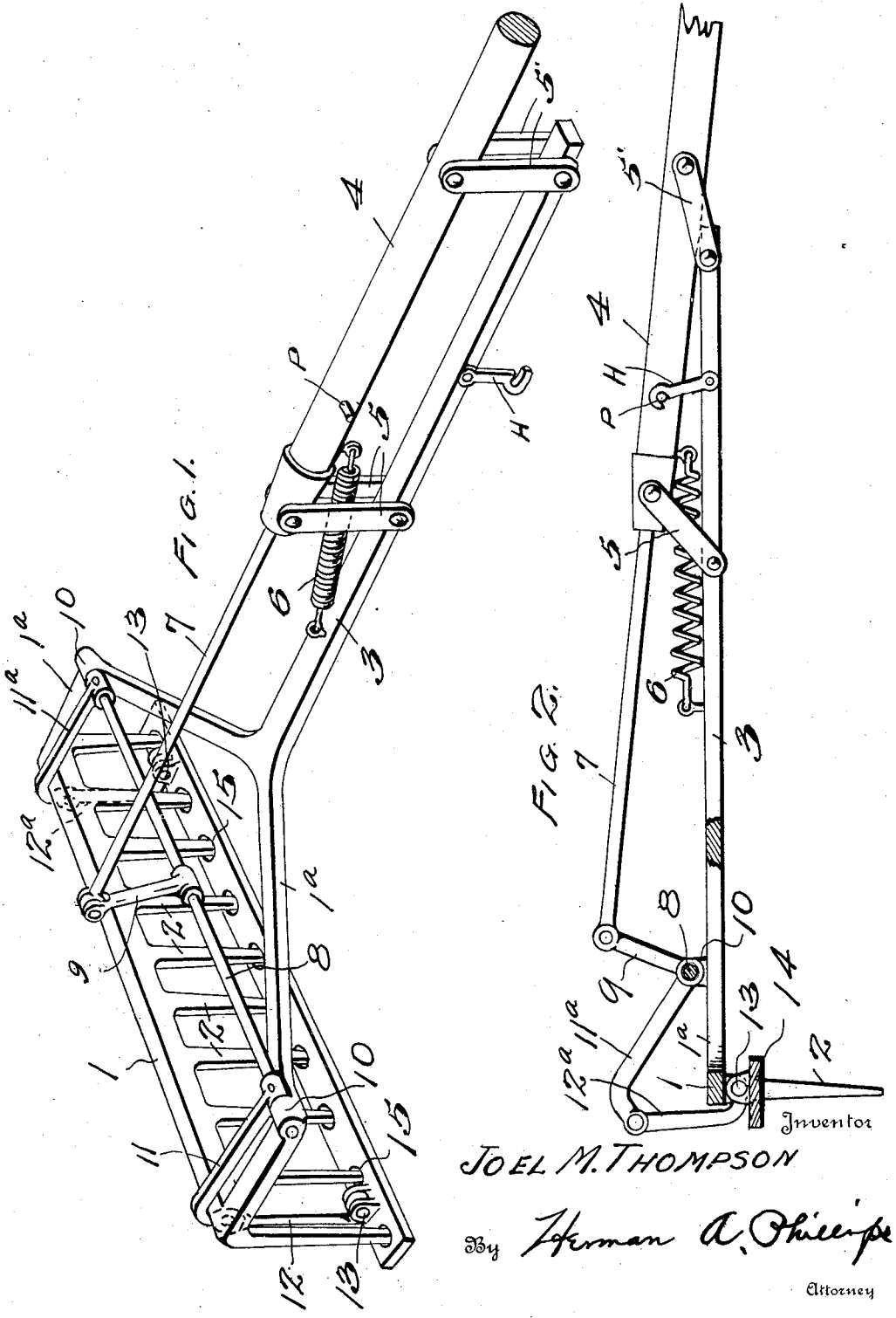

JOEL M. THOMPSON, OF BLOOMING PRAIRIE, MINNESOTA.

SELF-CLEANING RAKE.

1,259,803.  Specification of Letters Patent.  Patented Mar. 19, 1918.

Application filed May 14, 1917. Serial No. 168,548.

*To all whom it may concern:*

Be it known that JOEL M. THOMPSON, a citizen of the United States of America, residing at Blooming Prairie, in the county of Steele and State of Minnesota, has invented certain new and useful Improvements in Self-Cleaning Rakes, of which the following is a specification.

My present invention relates to improvements in self-cleaning-rakes, of the hand or lawn type, and the invention is designed specially for the purpose of providing an automatically operating device by means of which the rake teeth or tines are cleaned by the action of raking, or by the operator as he performs the raking movements.

The primary object of the invention is the production of a device of this character which is comparatively inexpensive of production, durable, and simple both in operation and construction.

The invention consists essentially in a two-part rake and in certain combinations and arrangements of parts used conjointly with these two parts whereby the action of raking also performs the function of cleaning the rake tines, all as will be hereinafter more fully pointed out and claimed.

In the accompanying drawings I have illustrated one complete example of the physical embodiment of my invention, constructed according to the best mode I have so far devised for the practical application of the principles of my invention, but while I shall hereinafter refer to this particular embodiment of the invention, it will be understood that changes and alterations may be made therein without departing from the spirit of my invention as long as such changes remain within the scope of my appended claim.

Figure 1 is a perspective view of a hand rake embodying my invention, shown in perspective, and in normal position.

Fig. 2 is a view in side elevation, with part in section, showing the rake in position when in use and pressure is being exerted on the rake during its working stroke.

As above intimated the rake of my invention, in its preferred form, involves a two-part construction, the rake head 1 being of usual or standard form and fashioned with the customary type of teeth or tines 2, 2, while the side bars 1ª 1ª projecting from the ends of the rake head, converge, and form the bar 3. These parts are preferably of metal, cast, or otherwise fashioned to the proper size and shape, and the bar 3 is pivotally connected with the handle 4, which forms the second part of the two-piece rake, by two pairs of pivoted links 5 and 5', spaced apart and holding the bar and handle in approximately parallel position under normal conditions, or, in other words, when pressure is not applied to the teeth or tines, as in the act of raking. Between the handle and bar a contractile spring 6 is located having its respective ends attached to the bar and handle and the function of this spring is to hold the bar and handle in normal position as shown in Fig. 1.

The wooden handle 4 stops short of the rake bar, but a metal extension rod 7 is fixed to and projects from the handle toward the rake head, and this rod is designed to rock the rock bar 8 through the pivoted link 9, the rock bar 8 being supported or journaled in perforated lugs 10, 10 on the side bars 1ª of the rake head. A pair of lever arms 11 and 11ª are fixed on the rock bar, one at each end, and these lever arms are pivoted to a pair of links 12 and 12ª, the latter being pivoted at 13 on a perforated guard plate or cleaner 14, formed with a series of alined perforations 15.

The cleaner plate 14 fits over the ends of the tines and is designed to slide up and down on the tines, the downward movement being for the purpose of cleaning or scraping off soil or other substance from the tines. The rake is manipulated in the customary manner, but when pressure is exerted on the tines against the surface to be raked, the handle is pulled or drawn backward with relation to the rake head, the spring being stretched, and the parts assume the position as shown in Fig. 2, with the cleaning bar 14 lifted. After the working stroke is finished and the rake lifted from the ground, the spring 6 returns the parts to normal position, and the movement of the cleaning plate or scraper 14 causes the tines to be cleaned as will be evident.

What I claim is:—

The combination with a rake head formed with tines and having a rearwardly projecting bar, of a handle above the bar, spaced links pivotally connecting the bar and handle and a contractile spring connecting the handle and bar, a perforated scraper plate movable on the tines, a rock bar supported on the rake head, angular arms connecting the rock bar and scraper plate and connections between the rock bar and handle for the purpose described.

In testimony whereof I affix my signature.

JOEL M. THOMPSON.

Copies of this patent may be obtained for five cents each, by addressing the "Commissioner of Patents, Washington, D. C."